Patented July 8, 1952

2,602,735

UNITED STATES PATENT OFFICE 2,602,735

MAKING PIG IRON

John J. Howard, Philadelphia, Pa.

No Drawing. Application November 9, 1950, Serial No. 194,940. In Canada August 3, 1950

3 Claims. (Cl. 75—40)

This invention relates to the production of pig iron, or its equivalent, from high-grade iron ore in a manner that obviates use of a blast furnace. Blast furnaces represent a large capital investment and are expensive to operate, as well as inefficient in treating high-grade iron ore, so it is an object of this invention to devise a pig-iron making process that does not require such a furnace.

Iron ore, carbon-bearing material and lime-bearing material are burned in a blast furnace under conditions to combine carbon of the carbon-bearing material and oxygen of the iron oxides of the ore to yield carbon dioxide gas that escapes while the lime of the lime-bearing material combines with silica of the iron ore to yield a slag-forming mass that floats on the surface of the molten bath of metallic iron and some contaminants thereof. The molten mass is drawn off and cast into pigs of pig-iron. These pigs are then used in some type of iron-melting furnace such as an open-hearth furnace where the pig-iron is formed into cast-iron objects, or is refined into steel. So it is an object of this invention to yield pig iron from the ore directly on such a furnace hearth.

These objects, and possibly others that appear hereinafter, can be attained by establishing and maintaining on a furnace hearth, an initial bath of molten pig-iron with its usual floating blanket of slag, and augmenting the pig-iron content of both without substantially increasing its carbon content by penetrating the slag blanket continually with bricks or other shapes having a pressure-compacted mixture of finely-divided high-grade iron ore, a carbon-bearing material, and a binder, the carbon being correlated with the oxygen of the ore to assure reduction of the iron oxides of the ore to metal when subjected to the temperature of the molten metal of the bath. The resulting metallic iron yielded under otherwise oxidizing conditions in the furnace adds itself to the metallic iron of the bath while the oxygen of the ore combines with the carbon of the brick to escape as a gas. The carbon content of the molten iron of the bath thus remains unchanged due to the fact that this is not a refining process but a reducing process and the resultant product is chemically identical with pig iron.

What happens is that upon penetrating and sinking through the slag blanket that covers the molten iron bath on the hearth, the brick is quickly heated to the temperature of that bath, about 2700° F., which causes chemical reaction between the intimately-contacting pressure-compacted finely-divided particles of iron ore and of carbon. This causes reduction of the iron oxides of the ore to metallic iron and to that extent, additional or augmenting pig-iron is added to such iron already in the molten bath. From this bath, the pig-iron can be tapped for any further treatment or use.

However, the iron ore that goes into the bricks must have a content of at least 66% metallic iron. If the ore does not have that high iron content naturally, then it must be appropriately beneficiated or concentrated until it does. Such appropriate ore will have a content of about 66% iron, 30% oxygen, and about 4% silica with a minor content of impurities. Most of the pig-iron and cast-iron scrap used today in open-hearth furnaces contains up to 2% silicon which, when oxidized in the furnace, becomes 4% silica in the slag, so the bath of my process only has to take care of the same amount of slag as heretofore.

It is to be noted that the brick of this invention is self-contained with its reactants carefully correlated so that all that is needed for the desired chemical reactions is the heat which the brick finds in the bath of molten pig-iron after it has penetrated the layer of floating slag on that bath, namely, 12 pounds of carbon to 16 pounds of oxygen in the ore. The brick has to be large enough to penetrate the slag blanket—and a standard size brick seems to be satisfactory if it has been compacted to be dense enough.

In the practice of the invention, finely subdivided iron ore of at least 66% iron content, and finely subdivided carbonaceous reducing material such as charcoal, coke, sawdust, and the like, are thoroughly mixed together and then firmly pressure-compacted together and held so, whereby they are in close and intimate contact for facilitating reaction between the reactants when they reach reaction temperature, that is iron-reduction temperature which is about 2700° F. To this end, the reactants are ground so as to pass through a screen, the meshes of which are spaced 40 to the inch, or what is usually referred to as a 40-mesh screen or sieve. However, the more finely ground, the better, for then the reducing approaches the efficiency of liquid-phase reaction. The reactants are preferably moistened with a suitable binder and pressed into such shapes as bricks or briquettes. A satisfactory shape has been found to measure 9" x 4½" x 2". The binder may be starch, molasses, goulac, and the like, but preferably should be free of sulphur, phosphorus, and other metal-contaminating substances. The purpose of the binder is to provide strength for the tightly-pressed shapes, permitting the necessary handling of the shaped body while maintaining its constituents in intimate contact during the early stage of the heat-treatment. These shapes are dried, whereupon they are ready for use, namely, to be thrown into a bath of slag-covered molten pig-iron, through whose slag blanket it sinks into the molten iron where it encounters sufficient heat to cause the required reduction reaction between the constituents of the brick or shape, whereupon the yielded metallic iron is released into and augments the molten iron of the bath. The reduction reaction that takes place within these shapes will take place irrespective of the atmosphere in which they find themselves, namely, regardless of whether that atmosphere is oxidizing or reducing.

The augmented iron, thus yielded has the least possible amount of slag. Ordinary blast furnaces have over 40% slag by weight per ton of iron, while by the practice of this invention the slag usually amounts to less than 20%, with the higher grade of ore used, the less the amount of slag.

Thus, this invention offers a method of treating iron ores of iron content so high as to be inappropriate for treatment in a blast furnace. Its method can be carried out in an open-hearth furnace or, indeed, in any other type of furnace that offers a bath of molten iron into which to throw the bricks or shapes of self-contained iron ore and reducing agent.

I claim:

1. The process of making pig-iron from high-grade iron ore in an oxidizing metal-refining furnace such as an open-hearth, which comprises establishing and maintaining on the hearth of the furnace a bath of molten pig-iron heated at least to 2700° F. and covered by a slag blanket, continually augmenting the pig-iron content of the bath without substantially increasing its carbon content by supplying to the bath through its slag blanket pressure-compacted shapes containing finely ground carbon-bearing reducing material and iron ore having an iron content of at least 66% with both held in intimate admixture by a binder for effecting on encountering the heat of the bath reduction of the iron ore to iron by the admixed carbon, and continually tapping off resulting pig-iron yielded under oxidizing conditions otherwise present in the furnace.

2. The process according to claim 1, wherein the carbonaceous material admixed with the iron ore is in quantity equal to 12 pounds of carbon to 16 pounds of oxygen in the ore.

3. The process according to claim 1, wherein the ore and the carbon-bearing material are ground fine enough to pass a 40-mesh screen.

JOHN J. HOWARD.

REFERENCES CITED

The following references are of record in the file of this patent:

FOREIGN PATENTS

| Number | Country | Date |
|--------|---------|------|
| 8,490 | Great Britain | of 1884 |
| 8,492 | Great Britain | of 1884 |
| 4,896 | Great Britain | of 1900 |